United States Patent [19]
Cullen et al.

[11] Patent Number: 5,778,666
[45] Date of Patent: Jul. 14, 1998

[54] METHOD AND APPARATUS FOR IMPROVING ENGINE FUEL ECONOMY

[75] Inventors: Michael John Cullen, Northville; David George Farmer, Plymouth; Gopichandra Surnilla, Westland; Susan Nicole Cok, Pinckney, all of Mich.

[73] Assignee: Ford Global Technologies, Inc., Dearborn, Mich.

[21] Appl. No.: 843,948

[22] Filed: Apr. 17, 1997

Related U.S. Application Data

[63] Continuation-in-part of Ser. No. 638,082, Apr. 26, 1996, Pat. No. 5,704,339.

[51] Int. Cl.$^6$ ............... F01N 3/20; F02D 41/14
[52] U.S. Cl. ............... 60/274; 60/276; 60/285; 60/297; 123/675; 701/109
[58] Field of Search ............... 123/674, 675; 60/274, 276, 285, 297; 701/109

[56] References Cited

FOREIGN PATENT DOCUMENTS

| | | |
|---|---|---|
| 03124909 | 5/1991 | Japan . |
| 05231136 | 9/1993 | Japan . |
| 05231137 | 9/1993 | Japan . |
| 05231138 | 9/1993 | Japan . |
| 05312026 | 11/1993 | Japan . |
| 06093845 | 4/1994 | Japan . |
| 06330741 | 11/1994 | Japan . |
| 07071234 | 3/1995 | Japan . |
| 07293233 | 11/1995 | Japan . |
| 07305644 | 11/1995 | Japan . |
| 07310534 | 11/1995 | Japan . |
| 08004522 | 1/1996 | Japan . |
| 08061052 | 3/1996 | Japan . |
| 08100639 | 4/1996 | Japan . |
| 08105318 | 4/1996 | Japan . |
| 08121147 | 5/1996 | Japan . |

*Primary Examiner*—Andrew M. Dolinar
*Attorney, Agent, or Firm*—Allan J. Lippa; Roger L. May

[57] ABSTRACT

A managed fuel air mode control system is provided which operates in an open loop lean mode of operation whenever open loop enable criteria is met. During the open loop lean mode of operation, a rich A/F purge mode of operation is dictated when a $NO_x$ trap is determined to be full. After purging the trap, engine operation returns to stoichiometric and either enters a closed loop learning operation or returns to lean operation depending upon the time that has passed since the last learning operation. During the learning operation, an adaptive control algorithm learns or updates a long term correction factor that is used during the open loop lean A/F mode of operation. Also during open loop operation, the amount of $SO_x$ accumulated in the trap is calculated and the open loop mode is terminated when the amount of $SO_x$ exceed a threshold.

18 Claims, 10 Drawing Sheets

METHOD AND APPARATUS FOR IMPROVING ENGINE FUEL ECONOMY

CROSS-REFERENCE TO RELATED APPLICATIONS

This application is a continuation-in-part of U.S. patent application Ser. No. 08/638,082, filed Apr. 26, 1996, now U.S. Pat. No. 5,704,339 the details of which are incorporated herein by reference.

TECHNICAL FIELD

This invention relates to fuel control systems and, more particularly, to a managed fuel air (MFA) mode of operating the engine for improving fuel economy and reducing unwanted exhaust emission.

BACKGROUND ART

It is well known in the art that higher fuel efficiency can be obtained by controlling the air/fuel ratio (A/F) on the lean side of stoichiometric. However, the traditional exhaust gas oxygen sensor (EGO) does not provide continuous information during an open loop lean A/F operation. Instead, the EGO sensor is essentially a switch with a transition at stoichiometric A/F. Thus, when operating lean, the engine is not robust with respect to noise factors such as age related deterioration of components, manufacturing variability of components, and environmental factors. As a result, engine fuel economy and driveability may deteriorate.

Efforts to improve open loop lean operation, for example, Aoki et al 4,445,481, utilize an open loop lean correction factor learned while operating at closed loop stoichiometric. However, such learning does not take place under conditions that exist during lean cruise operation but rather under other conditions such as immediately after engine warmup. Other proposals, such as disclosed in Uchida et al 4,913,122 and Hasegawa 4,498,445, learn and store a plurality of correction factors under various closed loop engine conditions to be used when similar engine conditions occur while operating open loop. None of these prior art systems proposes interrupting open loop lean operations and returning to closed loop stoichiometric operation to update the open loop correction factor under existing under-hood temperature conditions and engine operating conditions.

SUMMARY OF THE INVENTION

A managed fuel air mode is provided which operates the engine in an open loop lean mode of operation whenever open loop enable criteria are met. During the open loop lean mode of operation, the amount of $NO_x$ and $SO_x$ accumulated in a NOx trap located in the engine exhaust path is monitored. When the trap is full of $NO_x$, the A/F is ramped to stoichiometric and then switched to a rich A/F to purge the trap. After purging the trap, engine operation returns to stoichiometric and then ramps up to a lean operation. However, if the engine has been running lean for a predetermined time, then after the $NO_x$ purge and before the ramp to lean a closed loop stoichiometric operation is entered where an adaptive control algorithm learns or updates a long term correction factor that is used during the open loop lean A/F mode of operation. When learning is complete, the A/F ratio is slowly ramped back to the desired lean A/F ratio. During lean operation, the adaptive corrections learned at stoichiometric are applied. If the trap is determined to be full of $SO_x$, the MFA mode of operation is disabled and an extended operation a rich A/F may be undertaken to purge the trap of $SO_x$.

BRIEF DESCRIPTION OF THE DRAWINGS

A more complete understanding of the present invention may be had from the following detailed description which should be read in conjunction with the drawings in which:

FIGS. 3a–3i are flowcharts showing the operation of a preferred embodiment of the invention.

DETAILED DESCRIPTION OF PREFERRED EMBODIMENT

Figure 1:
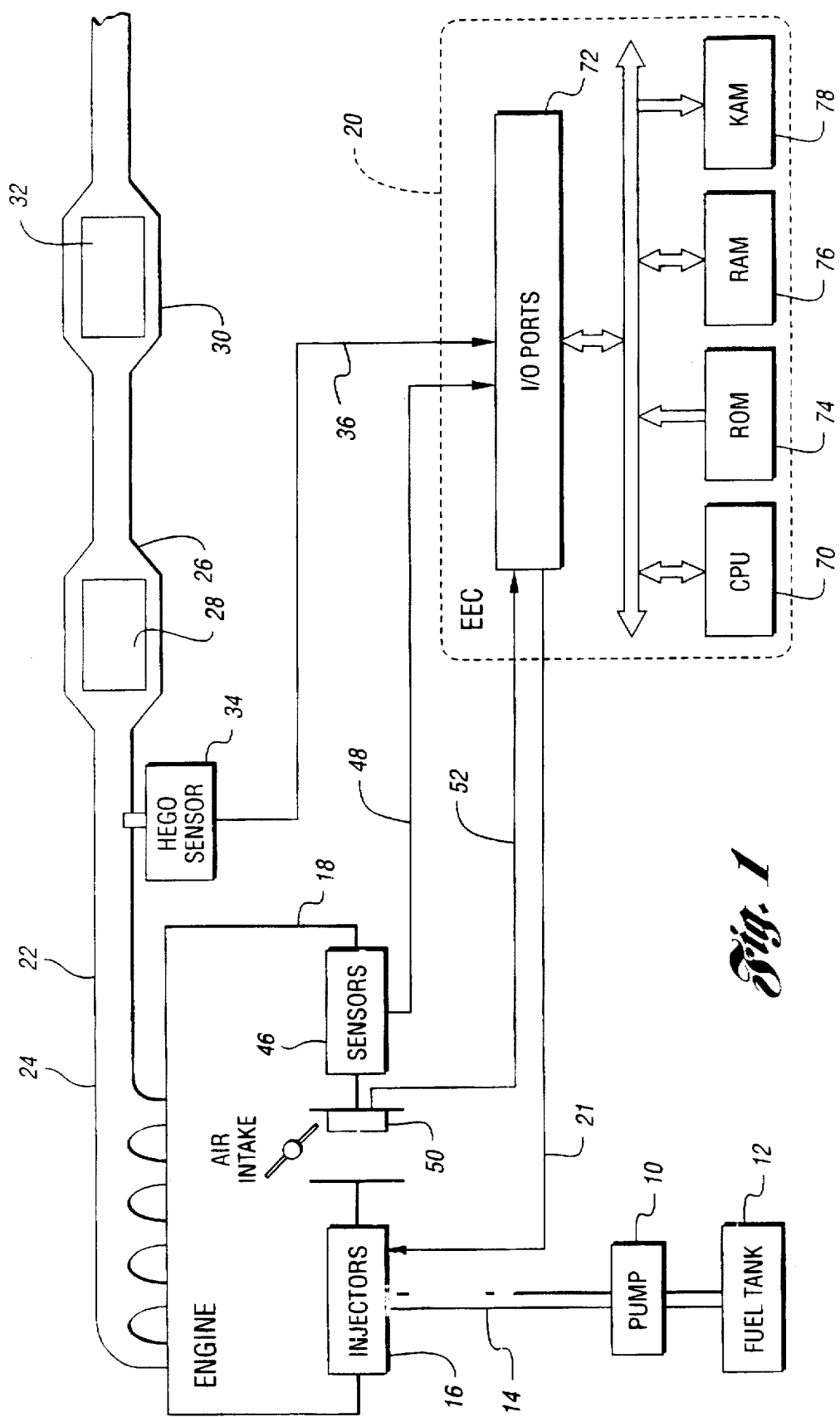
FIG. 1 is an overall block diagram of the control system of the invention.

Referring now to the drawings, and initially to FIG. 1, a fuel pump 10 pumps fuel from a tank 12 through a fuel line 14 to one or more sets or banks of injectors 16 which inject fuel into an internal combustion engine 18. The fuel injectors 16 are of conventional design and are positioned to inject fuel into their associated cylinder in precise quantities as determined by an electronic engine controller (EEC) 20, transmitting a fuel injector signal to the injectors 16 via signal line 21. The fuel injector signal is varied over time by EEC 20 to maintain an air/fuel ratio determined by the EEC 20. The fuel tank 12 contains a liquid fuel, such as gasoline, methanol or a combination of fuel types. An exhaust system 22, comprising one or more exhaust pipes and an exhaust flange seen at 24, transports exhaust gas produced from combustion of an air/fuel mixture in the engine to at least one catalytic converter 26. A second converter may be used with an 8 cylinder engine with two injector banks. The converter 26 contains a catalyst material 28 that chemically alters exhaust gas produced by the engine to generate a catalyzed exhaust gas.

The catalyzed exhaust gas is fed to a downstream $NO_x$ trap 32 typically composed of an alkali metal or alkaline earth materials in combination with platinum in order to store or occlude $NO_x$ under lean operating conditions. The trap 32 is contained in a housing generally indicated at 30.

A heated exhaust gas oxygen (HEGO) sensor 34 detects the oxygen content of the exhaust gas generated by the engine 18 and transmits a representative signal over conductor 36 to the EEC 20. Though not shown, a second HEGO sensor is preferably used with a V-8 engine and dual exhaust paths. Still other sensors, indicated generally at 46, provide additional information about engine performance to the EEC 20, such as crankshaft position, angular velocity, throttle position, air temperature, etc., over conductor 48. The information from these sensors is used by the EEC 20 to control engine operation.

A mass air flow sensor 50 positioned at the air intake of engine 18 detects the amount of air inducted into an induction system of the engine and supplies an air flow signal over conductor 52 to the EEC 20. The air flow signal is utilized by EEC 20 to calculate an air mass (AM) term which is indicative of a mass of air flowing into the induction system in lbs./min.

The EEC 20 comprises a microcomputer including a central processor unit (CPU) 70, input and output (I/O) ports 72, read only memory (ROM) 74 for storing control programs, random access memory (RAM) 76, for temporary data storage which may also be used for counters or timers, and keep-alive memory (KAM) 78 for storing learned values. Data is communicated over a conventional data bus as shown.

Figure 2:
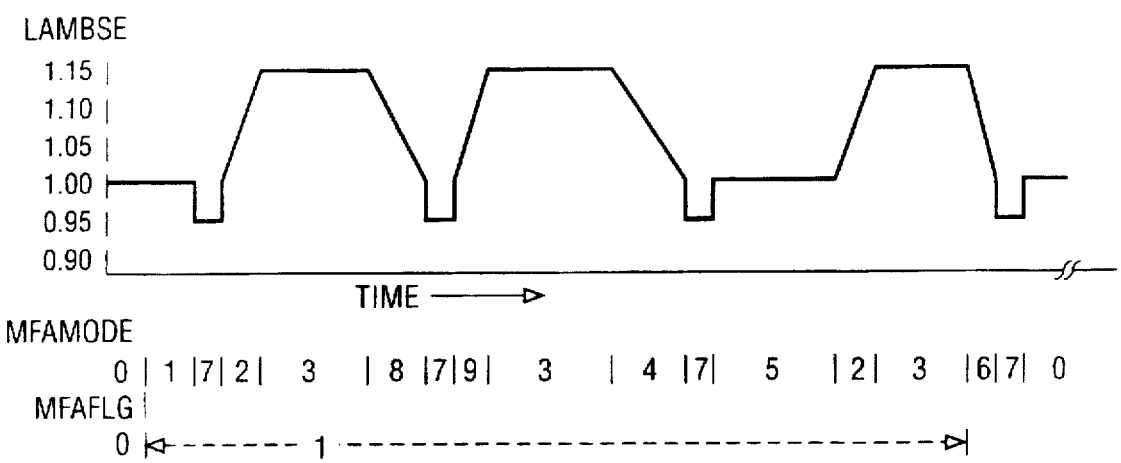
FIG. 2 is a graph illustrating various managed fuel air modes of engine operation implemented in accordance with the invention.
Figure 3A:
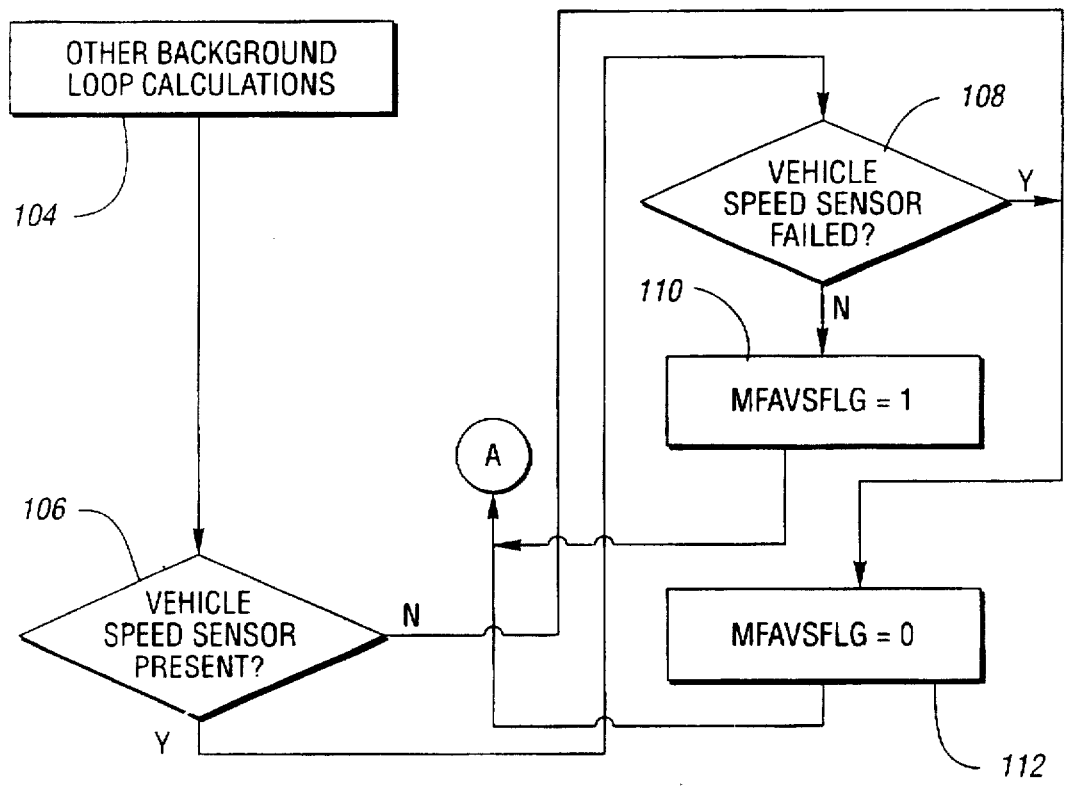
Figure 3B:
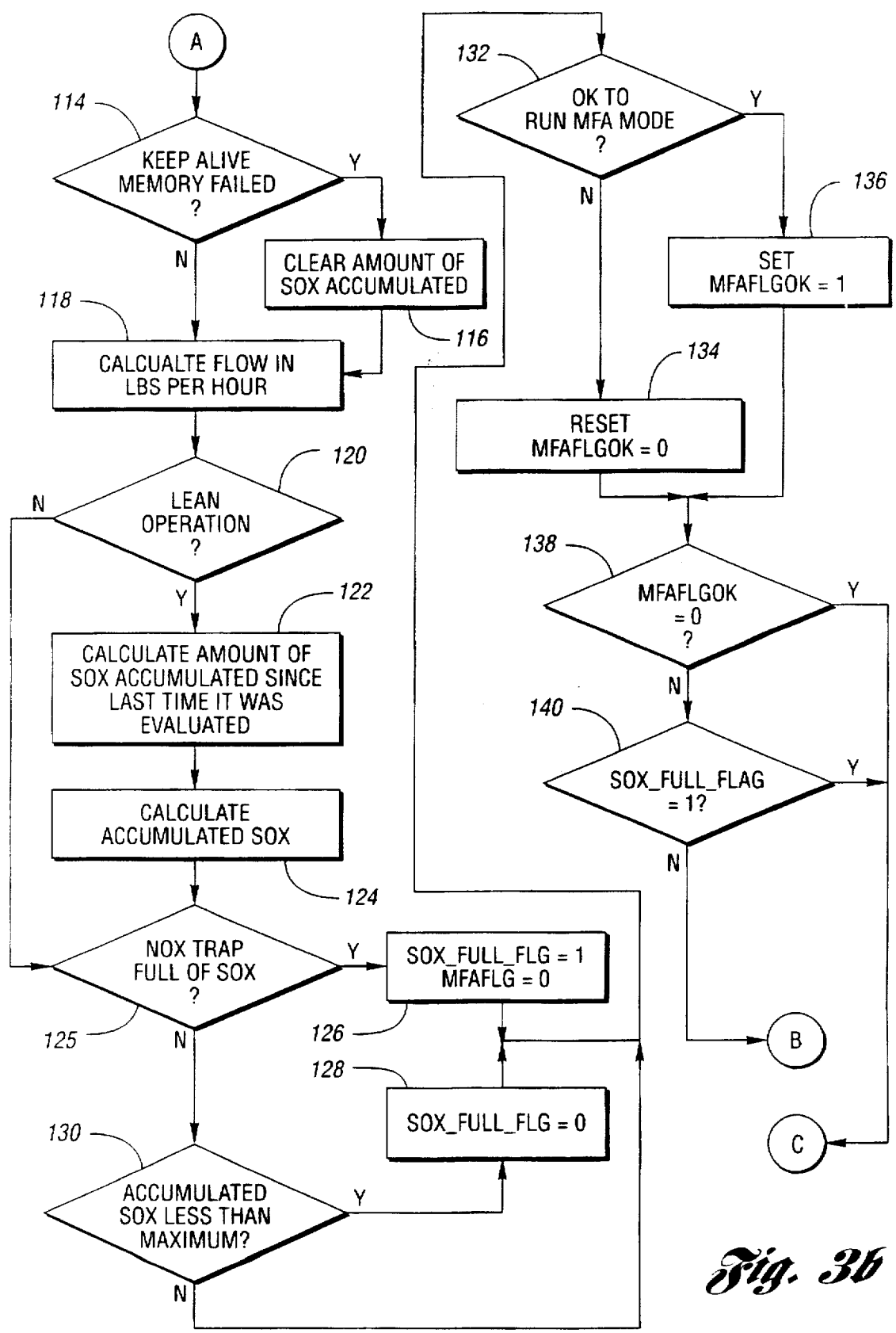
Figure 3C:
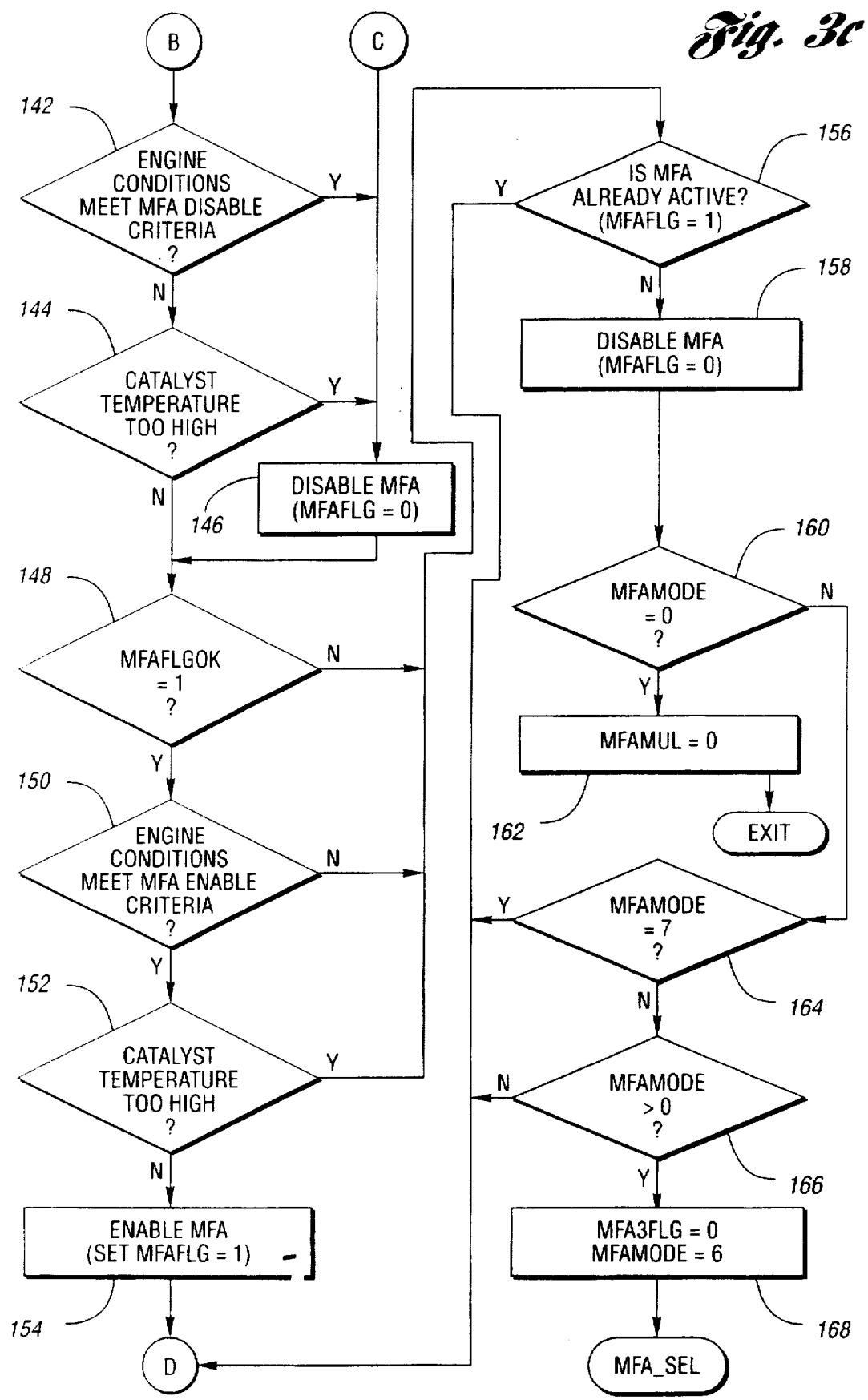
Figure 3D:
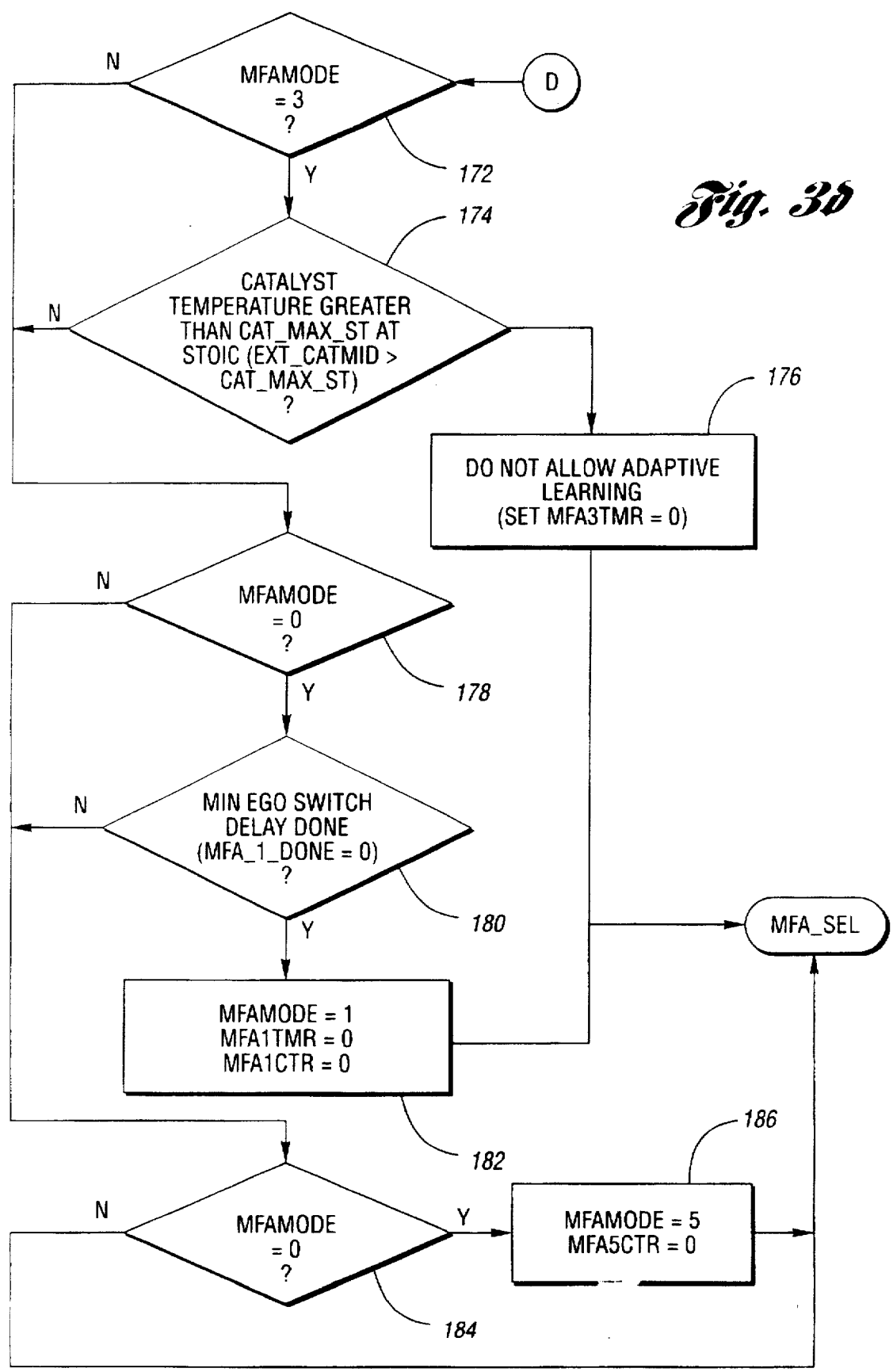
Figure 3C:
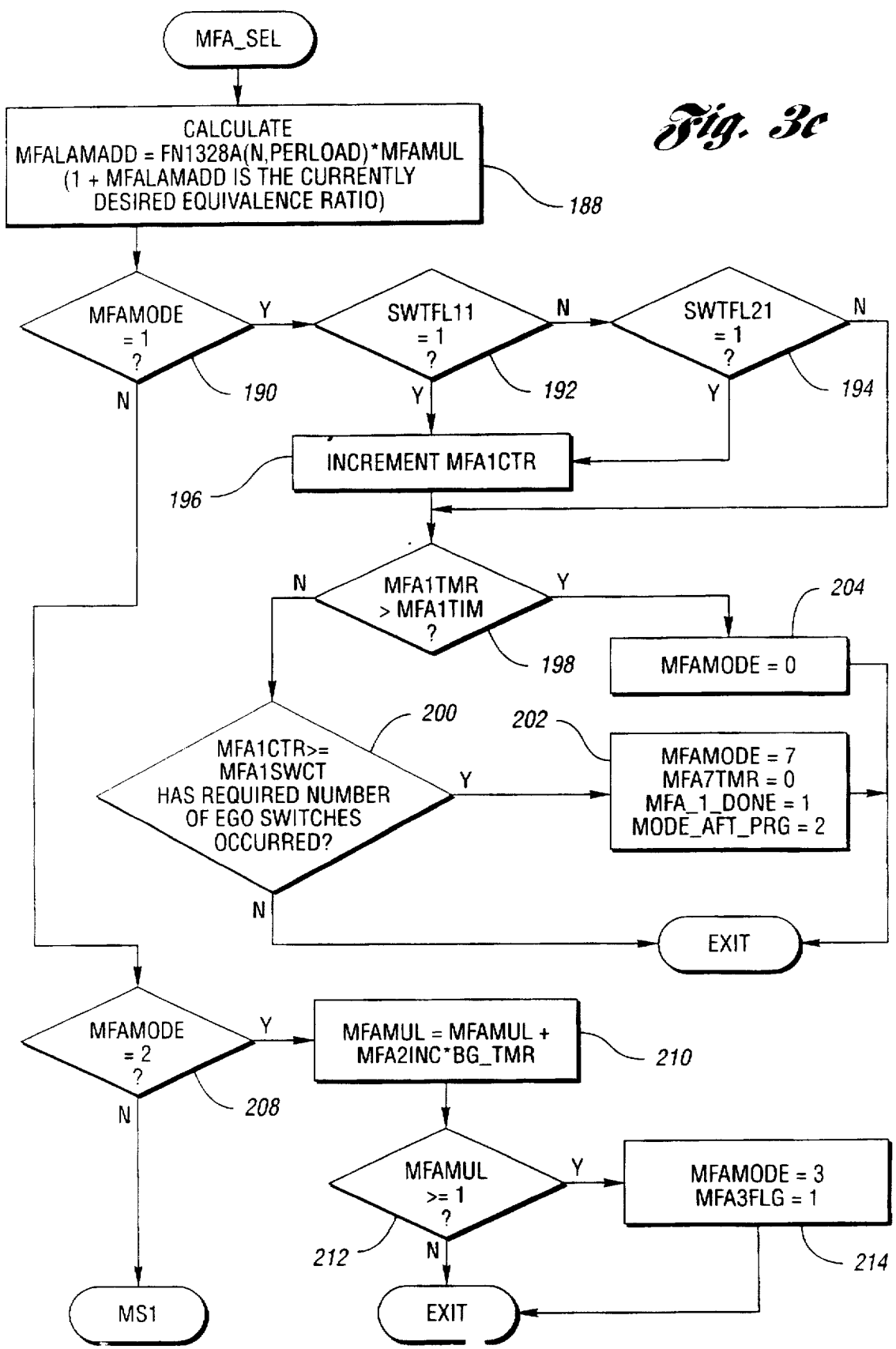
Figure 3F:
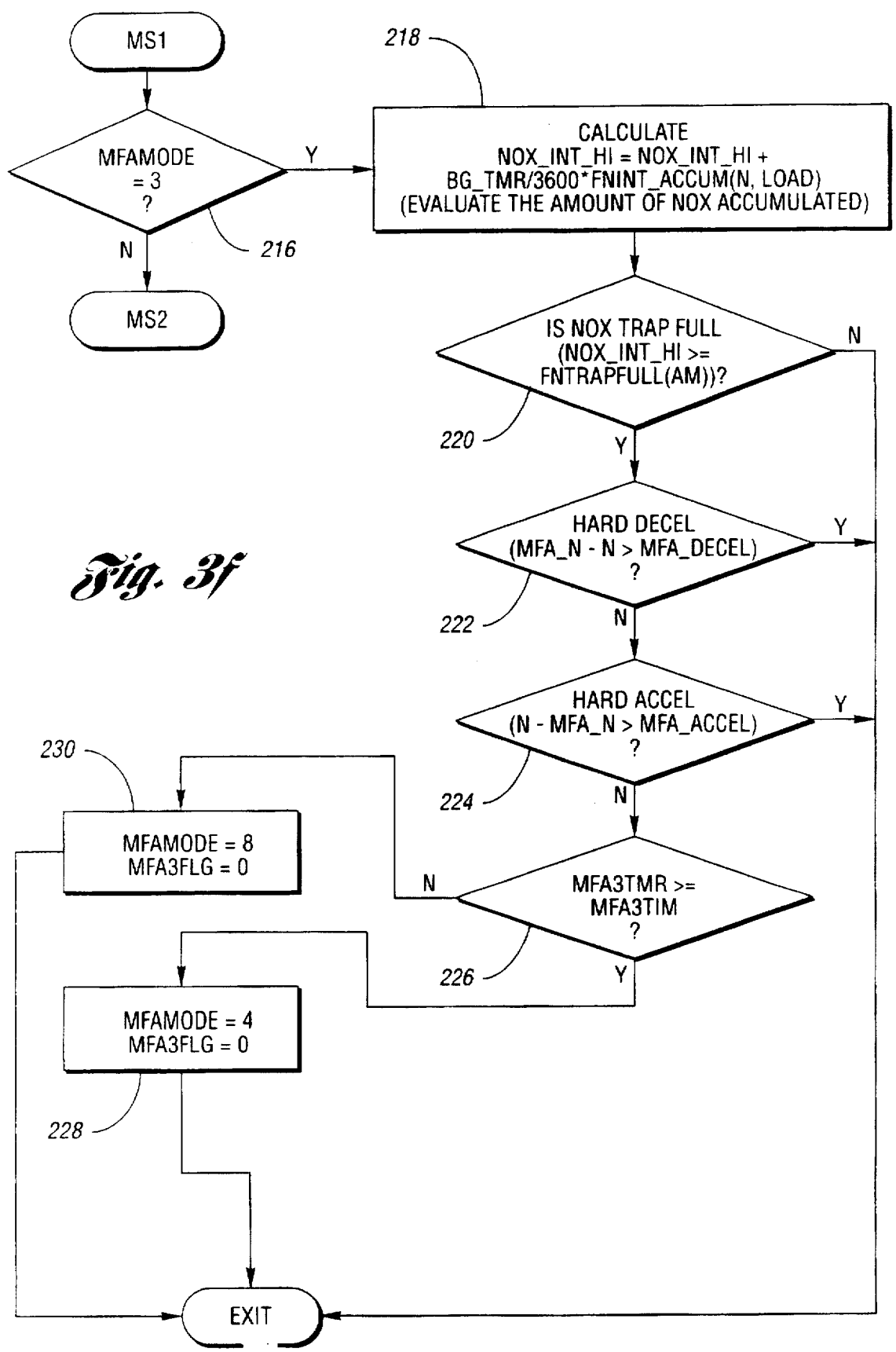
Figure 3G:
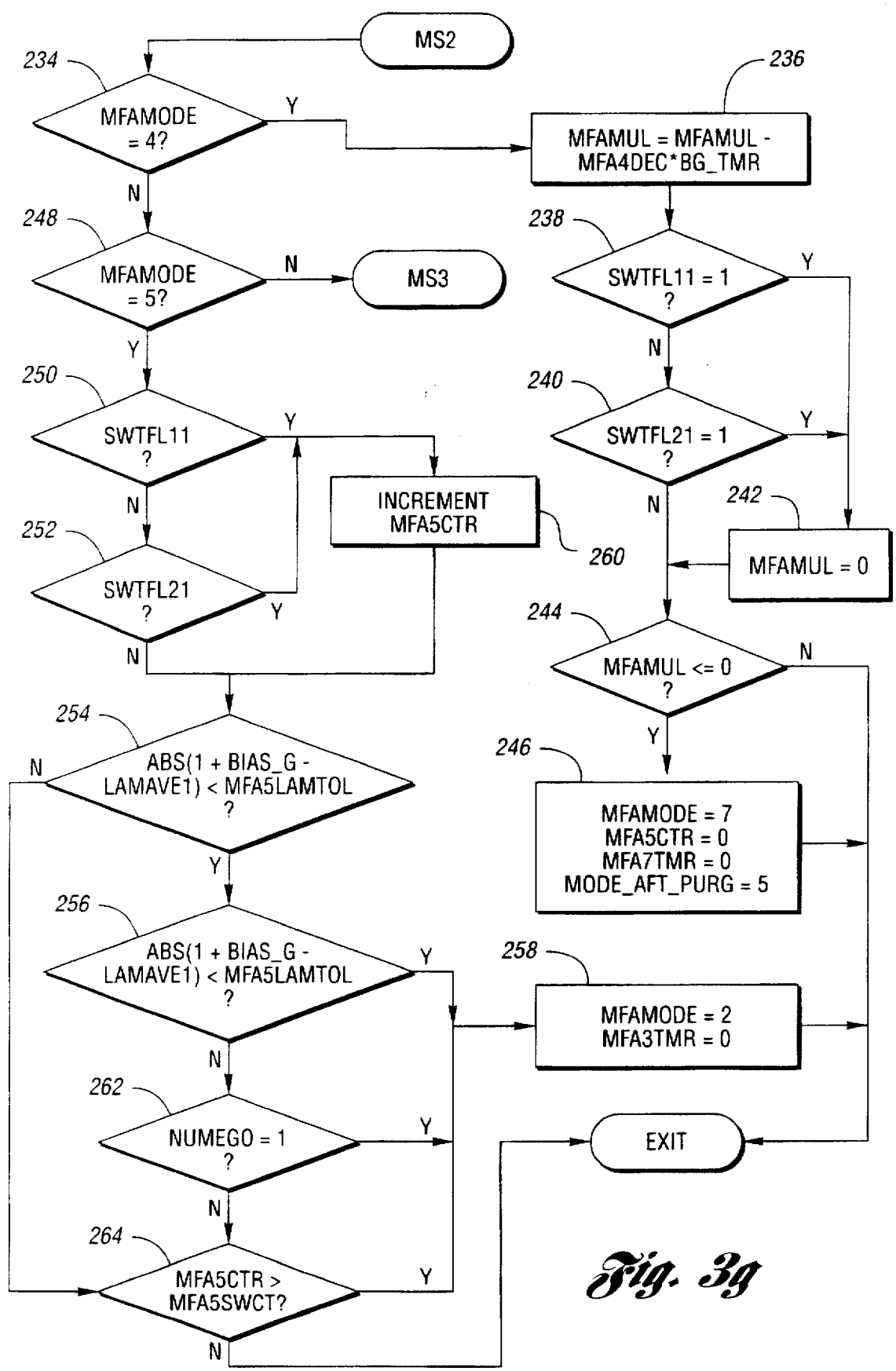
Figure 3H:
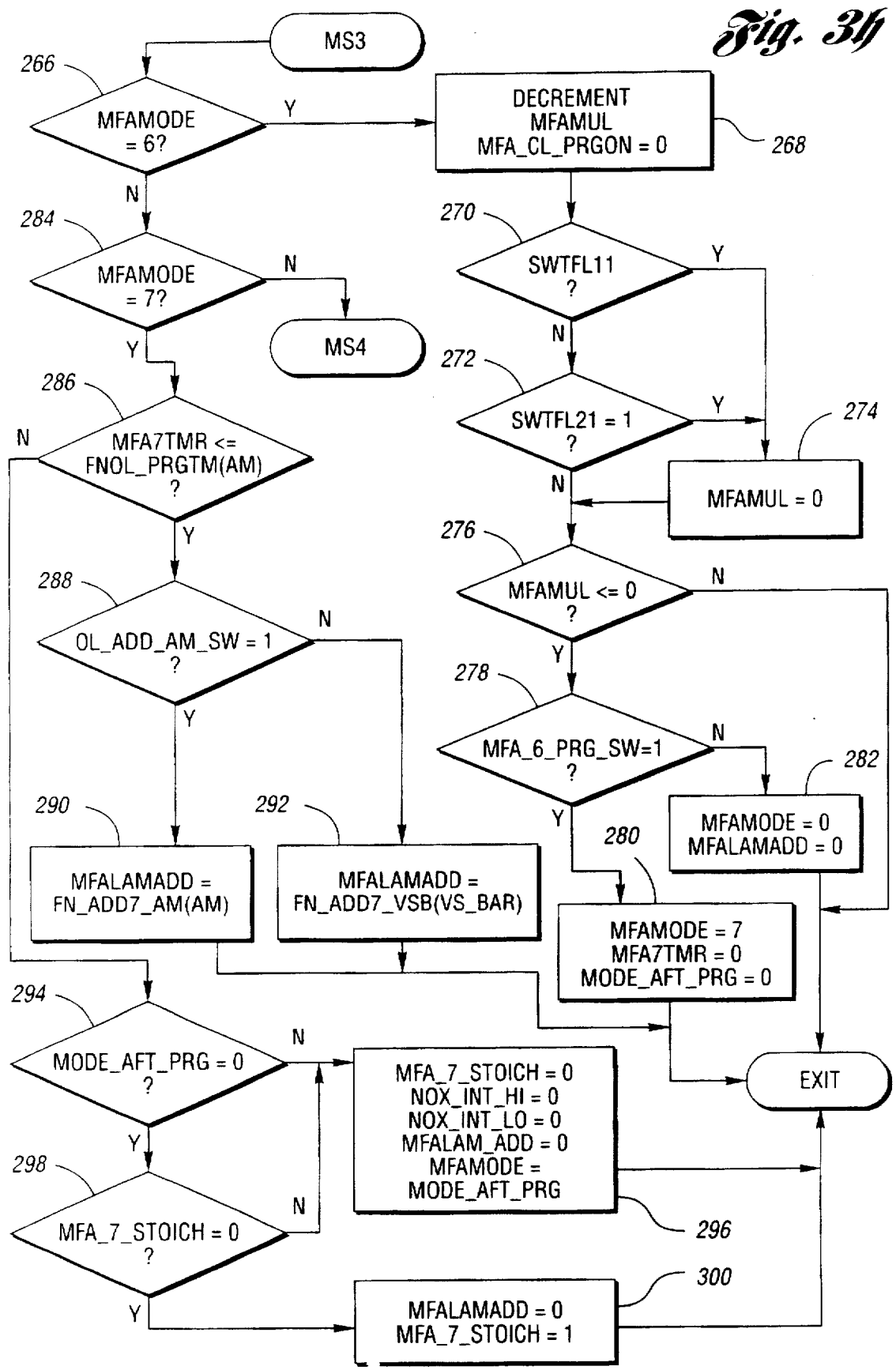
Figure 3I:
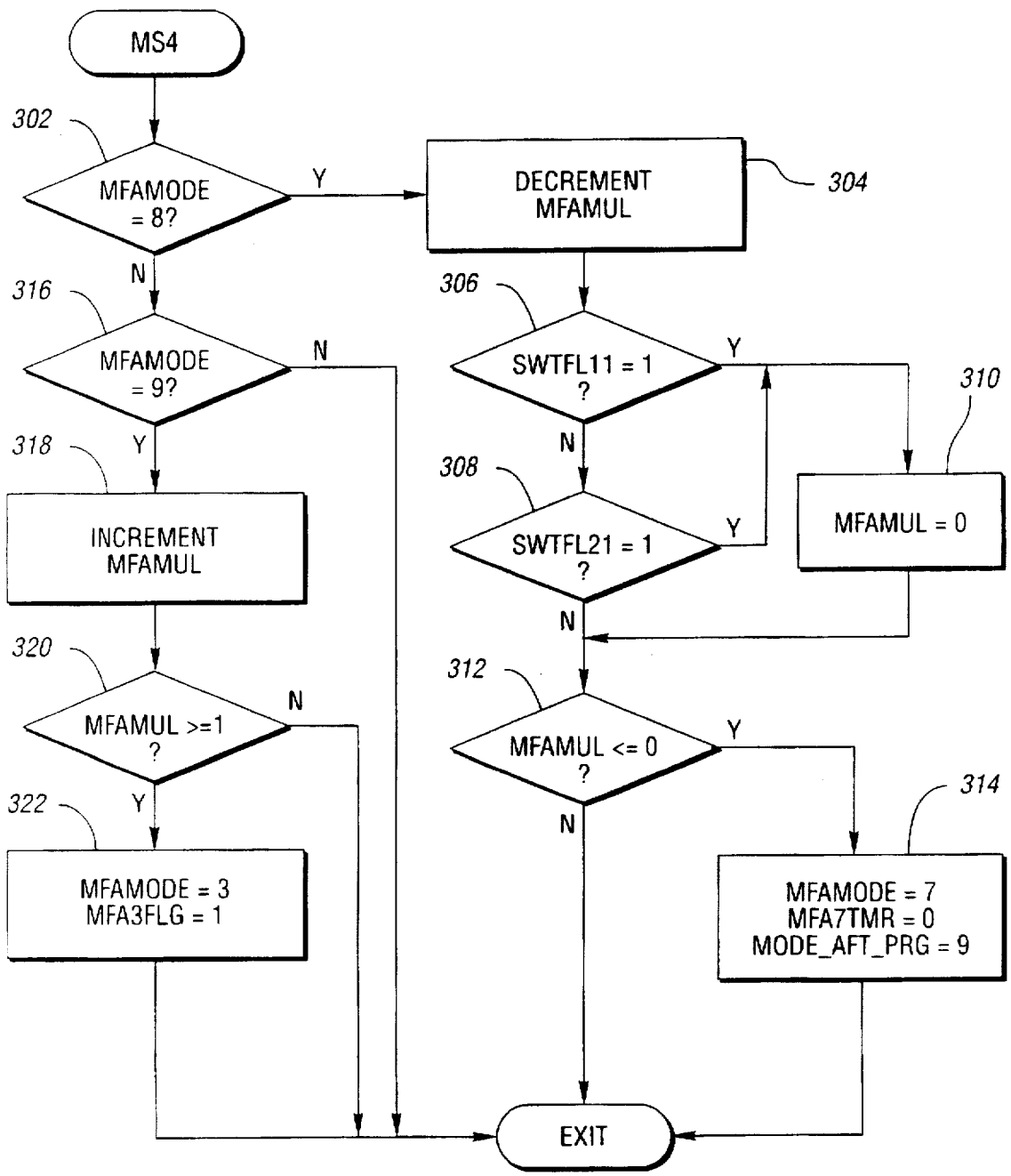

The program stored in ROM 74 implements a managed air/fuel strategy that is depicted in the graph of FIG. 2. Several speed/load conditions exist for entry into the managed fuel air (MFA) mode. Most of these have a hysteresis term to prevent hunting. The hysteresis terms makes it harder to enter the MFA mode of operation than to exit the MFA mode. Thus more stringent conditions apply to entry than exit. When an entry flag (MFAFLG) is set to 1, a mode register MFAMODE may assume one of several states from MFAMODE=1 to MFAMODE=9, not necessarily in that order. In this loop the strategy dictates a rich A/F operation whenever the $NO_x$ trap is full. Occasionally, the strategy returns to stoichiometric A/F in closed loop so that adaptive learning can take place.

MFAFLG equals 0 until MFA mode entry conditions are met at which time MFAFLG is set to 1 and the MFA mode can change from MFAMODE=0, to MFAMODE=1.

During MFAMODE=1, minimum learning at stoichiometric takes place before entering a rich MFAMODE=7 to purge the $NO_x$ trap before going lean. Exit from MFAMODE=1 to MFAMODE=7, is dependent on the occurrence of a minimum number of EGO switches within a predetermined time interval. If the time expires before the minimum number of EGO switches occurs, then the MFA mode is reset to MFAMODE=0. If the MFA mode entry criteria is still met, the MFA mode will again be set to MFAMODE=1 on the next program background loop and the system will again check for the required number of switches in the maximum allowable time. If the required number of EGO sensor switches have occurred, MFA_1_DONE is set and then MODE 7 $NO_x$ trap purge occurs, which will be discussed hereinafter.

During MFAMODE=2, the A/F is ramped from stoichiometric to lean at MFAMODE=3. This ramping occurs at a slow rate so the driver does not feel loss in torque at a given throttle position during the ramp to lean.

During MFAMODE=3, the strategy runs a steady lean A/F per a table FN1328A(N,LOAD) until one of the following conditions are met:

1. If the MFA3TMR exceeds a calibratable time interval MFA3TIM, then the MFA mode assumes MFAMODE=4, where a slow ramp back to stoichiometric occurs. After a $NO_x$ trap purge, a closed loop update of the fuel correction factor to be used during the next lean operation is performed. The MFA3TMR is the cumulative time spent in MFAMODE=3 since the last adaptive fuel update. When in MFAMODE=3, a catalyst midbed temperature is calculated in order to estimate the effect of stoichiometric A/F's. If this projected temperature exceeds a calibratable limit, then the MFAMODE=4 ramp is prohibited (by clearing the timer MFA3TMR).

2. MFAFLG is set to zero as a result of meeting the MFA speed/load type exit criteria.

3. When the $NO_x$ trap is full, MFAMODE=3 is exited via MFAMODE=8. This mode of exiting occurs more often than exiting via MODE 4. In this case the timer MFA3TMR, that indicates a desired lean time before visiting stoichiometric for update, is not cleared.

During MFAMODE=4, the A/F is incrementally reduced from lean to stoichiometric. At the end of MFAMODE=4, the strategy goes into MFAMODE=7, for purging the $NO_x$ trap before entering MFAMODE=5 (closed loop stoichiometric).

During MFAMODE=5, the open loop correction factor used during lean operation is updated through a closed loop adaptive learning process. The learning process continues until a calibratable number of EGO switches MFA5SWCT, are detected or until adaptive A/F has fully adapted.

MFAMODE=6, is entered if conditions to enter MFA are violated while in MFA mode. The A/F is incrementally reduced from lean to stoichiometric. If an EGO switch is encountered before reaching open loop stoichiometric, then it is assumed that the open loop correction estimate is wrong and a jump to closed loop stoichiometric MFAMODE=0 is entered. This mode differs from MODE 4 in that the MFAFLG has been set to 0, and MFA mode is being exited. Instead of the very slow ramp rates used for MFAMODE=4, a quick ramp is used.

During MFAMODE=7, the strategy jumps to a rich A/F ratio to purge the $NO_x$ trap for a calibratable time interval. If OL_ADD_AM_SW=1, then, as indicated in block 290, look up table FN_ADD7AM(AM) is used to establish the purge A/F ratio as a function of air mass, and the MFAMODE=7 is exited when MFA7TMR exceeds a purge time interval FNOL_PRGTM(AM) that is a function of air mass. However, if OL_ADD_AM_SW=0, then as indicated at block 292, look up table FN_ADD7_VSB(VS_BAR) is used to establish the purge A/F ratio as a function of vehicle speed and the mode is exited when MFA7TMR is greater than FNOL_PRGTM(AM). When MFA7TMR is greater than FNOL_PRGTM(AM) and MODE_AFT_PRG=0 one loop at stoichiometric A/F is run before exiting MODE 7. This mode can be entered in four ways.

1. When the $NO_x$ trap is full, this mode is entered via MFAMODE=8.

2. When the MODE 3 timer MFA3TMR expires, this mode is entered via MFAMODE=4, even if the $NO_x$ trap is not full.

3. When exiting MFA via MODE 6.

4. When MODE 1 is completed and before entering MODE 2 for the first time.

During MFAMODE=8, the strategy ramps from lean to stoichiometric. In this mode, the ramping down is quicker than in MFAMODE=4. This mode is used to exit MFAMODE=3 to purge the $NO_x$ trap. The MFA3TMR is not cleared in this mode so as to get a cumulative time spent in MFAMODE=3.

During MFAMODE=9, the strategy ramps from stoichiometric to lean at a somewhat quicker rate than in MFAMODE=2.

Referring now to FIGS. 3a–3i, a flowchart of software implementing the strategy depicted in FIG. 2 is shown. Referring initially to FIGS. 3a–3d, the program is entered at 104, and a check is made at blocks 106 and 108 to determine if a vehicle speed sensor is present and if so its status. If the sensor is present and has not failed, a flag MFAVSFLG is set at block 110, otherwise the flag is reset at block 112. Program flow then proceeds to decision block 114 where a check of a bit flag KAM_ERROR is made to determine whether the keep alive memory has failed. If so, at block 116 the amount of $SO_x$ accumulated in a the $NO_x$ trap since the last purge as represented by the contents of a register SOX_GRAMS is cleared. If KAM_ERROR=0, the fuel flow in lbs per hour is calculated at block 118 according to the formula:

$$FUEL\_FLOW\_MFA = AM * F\_A\_RATIO1 * 60$$

where:

AM=air mass in lbs/min

F_A_RATIO1 is the A/F for injector Bank 1

At decision block 120 a determination is made whether the engine is operating lean by checking a register SPK_LAMBSE to see if the value of Lambse used in spark calculations is greater than 1. If running lean, then a calculation is made at block 122 to determine the amount of $SO_x$ accumulated since the last time through this loop. The formula used is:

$$SOX\_DEL=FNSOXUP(FUELFLOW\_MFA)*FNSOXUPA(SPK\_LAMBSE,EXT\_NTR)*BG\_TMR/3600$$

where:

FNSOXUP(FUELFLOW_MFA) is a table giving the amount of $SO_x$ that is accumulated per background loop in grams/hr;

FNSOXUPA(SPK_LAMBSE,EXT_NTR) is a table providing an adjusting factor for the accumulation of sulfur for a given lambse and $NO_x$ trap temperature (EXT_NTR); and BG_TMR is the background loop timer in seconds.

At block 124 the accumulated $SO_x$ since the last purge is calculated, in accordance with the formula below, and stored in a register SOX_GRAMS:

$$SOX\_GRAMS=SOX\_GRAMS+SOX\_DEL$$

Whether the engine is operating lean or not, as determined at block 120, a determination is made at block 125 whether the $NO_x$ trap is full of $SO_x$ using the formula:

$$SOX\_GRAMS>SOX\_MAX\_GRAM$$

where:

SOX_MAX_GRAM is a calibratable maximum grams of $SO_x$, above which the $NO_x$ trap is considered full.

If the $NO_x$ trap is full, a SOX_FULL_FLG is set and flag MFAFLG is reset at block 126 to disable the MFA mode of operation. Though not shown in FIG. 2, several approaches are available for purging $SO_x$ from the $NO_x$ trap including providing a relatively long rich A/F excursion. If the $NO_x$ trap is not full, the flag SOX_FULL_FLG is reset at block 128. If the accumulated $SO_x$ is less than the maximum by a calibratable hysteresis term as determined at block 130, in accordance with the formula below, $$SOX\_GRAMS<SOX\_MAX\_GRAM-SOX\_MAX\_GR\_H$$

where:

SOX_MAX_GR_H is the hysteresis term for SOX_MAX_GRAM.

At block 132, a decision is made whether the MFA mode may be entered based on various sensor checks. If a failure of the air meter, EGO sensor, or ECT sensor is detected or KAM is corrupted, then a flag MFAFLGOK is reset to 0 at block 134. Otherwise the flag is set to 1 at block 136. In either event, at blocks 138–144 various checks are made to determine whether conditions exist to exit MFA. If the MFAFLGOK flag is reset, or the SOX_FULL_FLG is set, or the catalyst temperature is too high, or engine conditions meet a disable criteria, then at block the MFA mode is disabled by resetting the MFAFLG to 0. The engine conditions checked at block 142 that can cause disablement of the MFA mode may include, among others, engine temperature below a lower threshold, high driver demand, acceleration above a maximum, vehicle speed, engine RPM or load outside a predetermined window. The engine conditions have hysteresis terms associated with them. The estimated catalyst midbed temperature is checked at block 144 to determine if it is greater than a predetermined temperature CATMAX_LN_SH, above which an exit of the MFA mode is necessary due to excessive temperatures during lean A/F operation.

At blocks 148–152, the routine checks for the conditions for ENTRY into the MFA mode of operation, if the system is not already in MFA. Of course, if the system is already in MFA, the ENTRY condition are irrelevant. If the conditions examined in blocks 138–144 are not met, then at block 148 the flag MFAFLGOK is checked and if set, the engine conditions necessary to enable MFA mode are checked at block 150. If the criteria is met, at block 152 the estimated catalyst temperature is compared with a calibration constant CATMAX_LN_CL, at which entry into the MFA mode would be prohibited due to excessive temperatures during lean A/F operation. If the catalyst temperature is less than the constant, the MFA mode is enabled by setting the flag MFAFLG at block 154.

Otherwise, at blocks 156–170 a check is made to determined whether the MFA mode is already enabled and whether the system should remain in MFA. If MFAFLAG=0, it is time to exit MFA. However, if MFAMODE=7, a MODE 7 operation must be performed before exit. If MFAMODE does not equal 7 or 0, then MFA is exited by MODE 6. MODE 6 is a fast exit from Modes 2, 3, 4, 8, 9 or an immediate exit from modes 1 or 5. More specifically, if MFA is not active (MFAFLG=0), as determined at block 156, MFAFLG is reset at block 158 and a check is made at block 160 to see if a current mode indicating register MFAMODE show the system is in MFAMODE=0. If so, the ramping multiplier MFAMUL is reset at block 162 and the routine EXITS to perform other background loop calculations at block 104. If MFAMODE is not 0, a check is made at block 164 to see if MFAMODE=7. If not, but MFAMODE is greater than 0 as indicated in block 166, the mode register is set to MFAMODE=6 and MFA3FLG is reset at block 168. If MFA is active as determined at block 156 and MFAMODE=7 or is set to MFAMODE=6, the routine flows to FIGS. 3e–3i where the required actions for MODES 6 are 7 will be described.

If conditions exist to enable MFA, or if MFA is already active and conditions do not exist to disable MFA, then a check is made at block 172 to determine if the engine is operating lean, i.e., if MFAMODE=3. If so, a determination is made at block 174 whether the catalyst midbed temperature is above a value CAT_MAX_ST, at which entry into MFAMODE=4 would be prohibited, due to excessive temperatures during operation at stoichiometric A/F. If so, adaptive learning at stoichiometric is not allowed and the system remains in MODE 3 by resetting MFA3TMR=0 at block 176.

Otherwise, a determination is made at block 178 whether the mode register is set to MFAMODE=0. If so, a flag MFA_1_DONE is checked at block 180 to determine whether the minimum EGO switch delay has been completed. If so, at block 182, the mode register is set to MFAMODE=1, the time in MODE 1 is reset to 0, and the counter MFA1CTR, tracking the number of EGO sensor switches during MODE 1, is reset to 0 and the routine moves to FIGS. 3e–3i to carry out the MODE 1 operations.

Otherwise, at block 184 the mode register is checked to see if MFAMODE=0. If so, at block 186 the mode register is set to MFAMODE=5 and the MODE 5 counter MFA5CTR is reset and the routine moves to FIGS. 3e–3i to carry out the MODE 5 operations.

Program flow from the blocks 176, 182, 184, or 186 proceeds to block 188 where the A/F lambse adder MFALAMADD is calculated using the formula:

$$MFALAMADD = FN1328A(N, PERLOAD) * MFAMUL$$

where 1+MFALAMADD is the desired equivalence ratio depicted in FIG. 2.

At block 190 the mode register is checked to see if MFAMODE=1. If so, at blocks 192 and 194 a check is made whether the upstream EGO sensor in either injector Bank 1 or injector Bank 2 has switched during this background loop. If so, a counter MFA1CNT is incremented at block 196. At block 198, a MODE 1 timer MFA1TMR, that is reset upon entry to MFAMODE=1, is compared with MFA1TIM, which is the maximum time to wait for a minimum number of EGO switches to occur before a lean condition can be established. If the timer has not expired, the counter MFA1CNT is compared with the minimum number of switches MFA1SWCT at block 200. If the minimum number of EGO switches has occurred during the time interval MFA1TIM, then at block 202 the mode register is set to MFAMODE=7, the MODE 7 timer MFA7TMR is reset, the flag MFA_1_DONE is set and the register MODE_AFT_PRG is set to 2, indicating the MFAMODE to enter after performing the MODE 7 $NO_x$ purge. If the timer MFA1TMR exceeds MFA1TIM before the minimum number of EGO sensor switches occurs, then the mode register is set to MFAMODE=0 at block 204 and the routine EXITS to block 104.

If the mode register is set to MFAMODE=2, as determined at block 208, the multiplier MFAMUL is incremented at block 210 to incrementally increase MFALAMADD calculated in block 188. If MFAMUL is equal to or greater than 1, the mode register is set to MFAMODE=3 and the flag MFA3FLG is set at block 214 and the routine EXITS. Otherwise, if MFAMUL is less than 1 as determined by the block 212, the routine EXITS.

If the mode register is set to MFAMODE=3, as determined at block 216, then at block 218 the amount of $NO_x$ accumulated since the last time through this path is added, to the previous total $NO_x$ accumulated according to the formula:

$$NOX\_INT\_HI = NOX\_INT\_HI + BG\_TMR/3600 * FNINT\_ACCUM(N, LOAD)$$

where:

FNINT_ACCUM(N,LOAD) is a table containing the amount of $NO_x$, in grams, accumulated for particular engine speed and load entry points.

At block 220, the accumulated $NO_x$ is compared with a value FNTRAPFULL(AM) which is the amount of $NO_x$ above which the trap is considered full. If the trap is full, the rate of change of engine rpm is checked blocks 222 and 224 in accordance with the formulas:

$$MFA\_N - N < MFA\_DECEL \text{ and}$$

$$N - MFA\_N < MFA\_ACCEL$$

where:

N_MFA is the average engine rpm;

N is the instantaneous engine rpm;

MFA_DECEL is a deceleration limit in MFA;

MFA_ACCEL is an acceleration limit in MFA.

If the acceleration or deceleration is within the predetermined limits as determined by blocks 222 and 224, and the engine has been running lean at least as long as MFA3TIM as indicated in block 226, the mode register is set to MFAMODE=4 and the flag MFA3FLG is reset at block 228. On the other hand, if the trap is full but the MFA3TIM has not expired then the mode register is set to MFAMODE=8 and the flag MFA3FLG is reset at block 230. The routine EXITS if the trap is not full or the engine is experiencing a hard acceleration or deceleration.

If the mode register indicates MFAMODE=4, as determined at block 234, the multiplier MFAMUL is decremented at block 236. It will be recalled that MODE 4 is entered if the maximum time in MODE 3 has expired as determined in block 226. At blocks 238 and 240, a check is made to determine whether either of the upstream EGO sensors in injector Bank 1 or injector Bank 2 has switched during this background loop. If so, MFAMUL is reset at block 242. If not, the value of MFAMUL is checked at block 244 and greater than 0, the routine EXITS. Otherwise, at block 246 the mode register is set to MFAMODE=7, the MFA5CTR counter and the MFA7TMR timer is reset, and the register MODE_AFT_PURG is set to 5 indicating the MFAMODE to enter after the MODE 7 purging of the $NO_x$ trap.

If the mode register indicates MFAMODE=5, as determined at block 248, a switch counter MFA5CTR is incremented at block 260 if an EGO sensor switch has occurred since the last loop as determined by blocks 250 and 252. Also, at block 254 and 256, the closed loop error of A/F is checked to see if it is within a tolerance range. Block 254 tests the result of the following equation:

$$ABS(1 + BIAS\_G1 - LAMAVE1) < MFA5LAMTOL$$

where

LAMAVE1 is the average of the two most recent minimum and two most recent maximum short term closed loop A/F correction terms over one rich to lean cycle;

MFA5LAMTOL is a calibrated tolerance number establishing how close to stoichiometric the system must be driven before going lean again.

Block 256 tests the result of a similar equation for injector Bank 2:

$$ABS(1 + BIAS\_G2 - LAMAVE2) < MFA5LAMTOL$$

If A/F is in a tolerable range for Bank 1 and NUMEGO=1 or if A/F is in a tolerable range for both Banks or if MFA5CTR is greater than MFA5SWCT, then the mode register is set to MFAMODE=2 and MFA3TMR is reset at block 258 and the routine EXITS.

Each time one of the two upstream EGO sensors switches, the counter MFA5CTR is incremented at block 260 and compared with a calibratable number of switch occurrences MFA5SWCT at block 262. If learning is not complete as determined by block 254 and the maximum number of switches has not occurred as determined at block 262, then the routine EXITS. If learning is complete as to Bank 1 as determined by block 254 but not complete as to Bank 2 as determined by block 256 and the maximum number of switches has not occurred as determined at block 262, then the routine EXITS. The mode register will be set to MFAMODE=2 at block 258 even if the learning process has not completed if the EGO sensor switch count exceed the calibration constant MFA5SWCT as determined at block 262. The block 260 check the register NUMEGO. This register is set to 1 if only a single EGO sensor is used, as for example when the vehicle has a four cylinder engine. In that event block 256 will always answer NO.

If the mode register indicates MFAMODE=6, as determined at block 266, the multiplier MFAMUL is decremented at block 268. At blocks 270 and 272, a check is made to determine whether either of the upstream EGO sensors in injector Bank 1 or injector Bank 2 has switched during this background loop. If so, MFAMUL is reset at block 274. If not, the value of MFAMUL is checked at block 276 and if greater than 0, the routine EXITS. Otherwise, at block 278 the MFA_6_PRG_SW is checked. If this switch is set, at block 280 the mode register is set to MFAMODE=7, the MODE 7 timer MFA7TMR is reset, and the register MODE_AFT_PRG is set to 0 so that MFAMODE=0 will be entered after the $NO_x$ purge is performed. Otherwise, the mode register is set to MFAMODE=0 and the MFA lambse adder MFALAMADD is reset to 0 at block 282 and the routine EXITS.

If the mode register indicates MFAMODE=7, as determined at block 284, MODE 7 is entered where a rich A/F is used to purge the $NO_x$ trap. The rich A/F bias is determined by the value of MFALAMADD. While in MODE 7, i.e., while the timer MFA7TMR is less than or equal to a purge time FNOL_PRGTM(AM) which is a function of air mass, as determined at block 286, MFALAMADD is set equal to FN_ADD7_AM(AM) or FM_ADD7_VSB(VS_BAR) at blocks 290 or 292. With the former, the depth of purging for the $NO_x$ trap is a function of air mass and with the latter a function of vehicle speed. Whether MFALAMADD is set by block 290 or 292 depends upon whether a calibration switch OL_ADD_AM_SW is 1 or 0 respectively as determined at block 288. After setting MFALAMADD, the routine EXITS. MODE 7 is exited when the MODE 7 timer exceeds the purge time as determined at block 286. If the mode after purge register MODE_AFT_PRG is not set to MODE 0, then at block 296 the purge in stoichiometric register MFA_7_STOICH is reset, the high and low digital words, NOX_INT_HI and NOX_INT_LO, indicative of the amount of $NO_x$ accumulated is reset, MFALAMADD is reset and the mode register is set to MFAMODE=MODE_AFT_PRG. If the strategy is to exit from MODE 7 to MODE 0, after purge register MODE_AFT_PRG is set to 0 during FMAMODE=6 at block 278, the program flows from block 294 to block 298. The purge during stoichiometric register MFA_7_STOICH is checked at block 298 and if equal to 0, indicating that a stoichiometric purge is not scheduled, then MFAMODE is set to 0 at block 296. Otherwise, MFALAMADD is set to 0 and the MFA_7_STOICH register is set to 1 at block 300.

If the mode register indicates MFAMODE=8, as determined at block 302, the multiplier MFAMUL is decremented at block 304. At blocks 306 and 308, a check is made to determine whether either of the upstream EGO sensors in injector Bank 1 or injector Bank 2 has switched during this background loop. If so, MFAMUL is reset at block 310. If not, the value of MFAMUL is checked at block 312 and if greater than 0, the routine EXITS. Otherwise, at block 314 the mode register is set to MFAMODE=7, the MODE 7 timer MFA7TMR is reset, and the register MODE_AFT_PRG is set to 9 so that MFAMODE=9 will be entered after the $NO_x$ purge is performed.

If the mode register is not set to MFAMODE=8, as determined at block 302, and not set to MFAMODE=9, as determined at block 316, the routine EXITS. Otherwise, if the mode register is set to MFAMODE=9, the multiplier MFAMUL is incremented at block 318 and if less than 1 as determined by the block 320, the routine EXITS. If MFAMUL is equal to or greater than 1, then at block 322 the mode register is set to MFAMODE=3 and the flag MFA3FLG is set and the routine EXITS.

The closed loop fuel mass calculation is used for learning during MFAMODE=5 or MFAMODE=1, or whenever MFA disable conditions exist, but also may be used when MFAMODE=3 at relatively high percentage load conditions where lean air/fuel would not deliver the required power. This can be accomplish by entering 0 in the table FN 1328A at these speed and load conditions.

The required closed loop fuel flow may be expressed as:

$$fuel\_mass = (air\_mass * KAMREF)/(equivalence\_ratio * LAMAVE)$$

From this fuel mass calculation a fuel pulse width can be determined based on the fuel injector characteristic function. An example of the updating of KAMREF is to assume that there is a −10% error in the air mass measurement and that KAMREF is initially set to 1 and MFA5LAMTOL equals 0.02. In feedback control, the short term correction factor LAMAVE term will be driven to 0.9 to achieve stoichiometric A/F. This will happen very quickly because the feedback system is designed to ramp fuel pulse-width as much as is required to achieve EGO switches. The long term trim, KAMREF, will respond to the fact that LAMAVE is consistently equal to about 0.9. It is intentionally learned at a slow rate so it can differentiate true error from noise such as that which occurs on transients. In this case, KAMREF will eventually equal about 1.11(1/0.9). When this occurs, LAMAVE will equal about 1.0 and the expression evaluated at block 226 will be true and the ramp to lean (MFAMODE= 2) should begin.

The required open loop fuel flow may be expressed as:

$$fuel\_mass=(air\_mass*KAMREF)/equivalence\_ratio$$

Note that in the open loop calculation the short term correction factor LAMAVE is not used. However, the long term correction factor KAMREF is used to accurately achieve the desired lean A/F.

While the best mode for carrying out the present invention has been described in detail, those familiar with the art to which this invention relates will recognize various alternative designs and embodiments for practicing the invention as defined by the following claims.

What is claimed is:

1. A method of operating an internal combustion engine with a $NO_x$ trap located in the engine exhaust path comprising a sequence of the following steps:

operating the engine in an open loop lean fuel control mode wherein the fuel calculation includes an open loop correction factor;

calculating the $NO_x$ accumulated in said trap during said lean fuel control mode;

when the accumulated $NO_x$ exceeds a predetermined amount ramping the A/F of the mixture supplied to said engine from a lean A/F to stoichiometric and switching from stoichiometric to a rich A/F for a predetermined purge time and thereafter switching back to stoichiometric;

ramping the A/F of the mixture supplied to said engine to said lean A/F from stoichiometric if the time since the last correction of said open loop correction factor is less than a predetermined update interval; and operating the engine in a closed loop fuel control mode at stoichiometric to update said open loop correction factor if the time since the last correction of said open loop correction factor exceeds said update interval.

2. The method defined in claim 1 comprising the further step of:

calculating $SO_x$ accumulated in said trap during said lean fuel control mode;

when the accumulated $SO_x$ exceeds a predetermined amount exiting said lean fuel control mode.

3. The method defined in claim 1 comprising the further step of:

calculating $SO_x$ accumulated in said trap during said lean fuel control mode;

when the accumulated $SO_x$ exceeds a predetermined amount ramping the A/F of the mixture supplied to said engine from a lean A/F to stoichiometric and switching from stoichiometric to a rich A/F for a predetermined purge time.

4. The method defined in claim 1 wherein the rate at which the A/F is decremented in ramping from lean to stoichiometric is faster if said update interval has not expired than if said update interval has expired.

5. The method defined in claim 4 wherein the rate at which the A/F is incremented in ramping from stoichiometric to lean is faster if said update interval has not expired than if said update interval has expired.

6. The method defined in claim 1 wherein said ramping to stoichiometric is inhibited if the engine is accelerating or decelerating beyond predetermined limits.

7. The method defined in claim 1 wherein said engine is operated in a closed loop stoichiometric fuel control mode prior to entry into said open loop lean fuel control mode and entry into said open loop lean fuel control mode is condition upon predetermined entry criteria.

8. The method defined in claim 7 wherein said $NO_x$ trap is purged before entering said open loop lean fuel control mode.

9. The method defined in claim 7 wherein said entry criteria includes entry conditions that have hysteresis have hysteresis terms associated therewith that make it harder to enter said lean mode of operation than to exit said lean mode of operation.

10. The method defined in claims 1 where a catalytic converter is located in said exhaust path upstream from said $NO_x$ trap, said method comprising the further steps of calculating an estimated catalyst midbed temperature at stoichiometric while in said lean mode of operation and inhibiting said ramping to stoichiometric if said estimated temperature exceeds a calibratable limit.

11. The method defined in claims 1 where a catalytic converter is located in said exhaust path upstream from said $NO_x$ trap, said method comprising the further steps of calculating a catalyst midbed temperature while in said lean mode of operation and exiting said lean mode of operation if said temperature exceeds a calibratable limit.

12. A system for controlling the air/fuel ratio (A/F) and an engine having a $NO_x$ trap located in the exhaust path, said system including a finite state machine;

said machine increasing said A/F toward a lean A/F at a first predetermined rate in an open loop control scheme, and transitioning to a STATE 3 upon reaching a predetermined lean A/F;

said machine exiting said STATE 3 if said $NO_x$ trap is full and decreasing said A/F toward stoichiometric at a second predetermined rate and upon reaching stoichiometric transitioning to a STATE 7 where the engine A/F is rich of stoichiometric in order to purge said trap;

upon completion of said purge, said machine transitioning from STATE 7 to a STATE 5 where said A/F is stoichiometric;

while in said STATE 5 said machine updating an open loop correction factor based on long term variations of a short term correction factor;

said machine transitioning from said STATE 5 to said STATE 3 upon completion of said updating.

13. The system defined in claim 12 further comprising at least one exhaust gas oxygen (EGO) sensor;

said machine assuming a STATE 0 in which the engine is operated at stoichiometric A/F in response to computer initialization and engine warmup;

said machine responsive to predetermined entry conditions to transition from said STATE 0 to a STATE 1 upon the first occurrence of said entry conditions;

said machine transitioning from said STATE 1 to a STATE 2 in response to a first predetermined number of EGO switches within a predetermined time interval and otherwise returning to STATE 0;

said machine, while in said STATE 2 increasing said A/F at said first predetermined rate said machine transitioning from STATE 3 to a STATE 4 where said A/F is reduced toward stoichiometric at said second predetermined rate;

said machine transitioning from said STATE 5 to said STATE 2 upon the first to occur of completion of said updating or upon detection of a second predetermined number of EGO switches.

14. The system of claim 13 wherein said machine is responsive to predetermined exit conditions to transition from said STATE 3 to a STATE 6 where said A/F is reduced toward stoichiometric at a third predetermined rate exceeding said second predetermined rate.

15. The system of claim 14 wherein said machine upon detection of an EGO switch during said STATE 6 immediately switching to STATE 7 to purge said trap and then switching to a closed loop stoichiometric A/F.

16. An article of manufacture comprising:

a computer storage medium having a computer program encoded therein for controlling the amount of fuel supplied to an engine having an exhaust passage with a $NO_x$ trap located therein, said computer storage medium comprising:

code for operating the engine in an open loop lean fuel control mode wherein the fuel calculation includes an open loop correction factor;

code for calculating the $NO_x$ accumulated in said trap during said lean fuel control mode;

code for ramping the A/F of the mixture supplied to said engine from a lean A/F to stoichiometric and switching from stoichiometric to a rich A/F for a predetermined purge time when the accumulated $NO_x$ exceeds a predetermined amount, and thereafter switching back to stoichiometric;

code for ramping the A/F of the mixture supplied to said engine to said lean A/F from stoichiometric if the time since the last correction of said open loop correction factor is less than a predetermined update interval; and code for operating the engine in a closed loop fuel control mode at stoichiometric to update said open loop correction factor if the time since the last correction of said open loop correction factor exceeds said update interval.

17. The article defined in claim 16 wherein said medium further comprises:

code for calculating $SO_x$ accumulated in said trap during said lean fuel control mode;

code for exiting said lean fuel control mode when the accumulated $SO_x$ exceeds a predetermined amount.

18. The article defined in claim 16 wherein said medium further comprises:

code for calculating $SO_x$ accumulated in said trap during said lean fuel control mode;

code for ramping the A/F of the mixture supplied to said engine from a lean A/F to stoichiometric and switching from stoichiometric to a rich A/F for a predetermined purge time when the accumulated $SO_x$ exceeds a predetermined amount.

* * * * *